United States Patent
Terry et al.

(10) Patent No.: US 6,415,047 B1
(45) Date of Patent: Jul. 2, 2002

(54) OPTICAL FEATURE EXTRACTION APPARATUS AND ENCODING METHOD FOR DETECTION OF DNA SEQUENCES

(75) Inventors: David H. Terry, Sykesville; William A. Christens-Barry, Ellicott City; Bradley G. Boone, Columbia, all of MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 09/212,044

(22) Filed: Dec. 15, 1998

Related U.S. Application Data

(62) Division of application No. 07/975,908, filed on Nov. 13, 1992, now Pat. No. 5,850,479.

(51) Int. Cl.[7] .................................................. G06K 9/00

(52) U.S. Cl. .......................... 382/129; 382/211; 707/20; 702/20

(58) Field of Search ................................ 382/128, 129, 382/211; 435/6, 199; 702/19, 20; 356/39

(56) References Cited

U.S. PATENT DOCUMENTS

| | | | | |
|---|---|---|---|---|
| 4,630,306 A | * | 12/1986 | West et al. | 382/197 |
| 4,862,360 A | * | 8/1989 | Kimura et al. | 382/129 |
| 4,980,827 A | * | 12/1990 | Hara | 382/129 |
| 5,297,288 A | * | 3/1994 | Hemminger et al. | 382/129 |
| 5,300,432 A | * | 4/1994 | Simcox et al. | 935/199 |
| 5,502,773 A | * | 3/1996 | Tibbetts et al. | 382/129 |
| 5,541,064 A | * | 7/1996 | Bacus et al. | 435/6 |
| 5,800,992 A | * | 9/1998 | Fodor et al. | 435/6 |
| 5,858,773 A | * | 1/1999 | Mazodier et al. | 435/320.1 |

* cited by examiner

*Primary Examiner*—Yon J. Couso
(74) *Attorney, Agent, or Firm*—Francis A. Cooch

(57) ABSTRACT

The invention is an optical feature extraction apparatus which uses video display, spatial light modulation, and detection components in conjunction with microlenslet replicating optics, to expedite the recognition of DNA sequences based on their symmetry properties and, specifically, to classify short (6 bases in length) sequences of DNA as palindrome or nonpalindrome. The DNA sequences are symbolically encoded using a novel method. Multichannel operation is achieved through the replication of input scenery, making possible a higher throughput rate than for single channel systems.

20 Claims, 3 Drawing Sheets

FIG.1
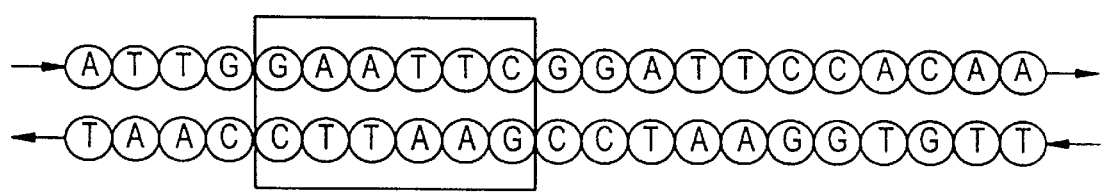
FIG.2A  FIG.2B  FIG.2C
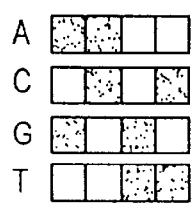 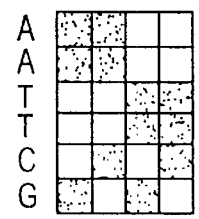 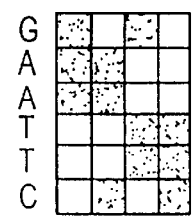

a
b
c
d
e
f g(x,y)

$t_m(x,y)'$

OPTICAL FEATURE EXTRACTION APPARATUS AND ENCODING METHOD FOR DETECTION OF DNA SEQUENCES

CROSS-REFERENCE TO RELATED APPLICATION

This is a divisional of prior application Ser. No. 07/975,908, filed Nov. 13, 1992 now U.S. Pat. No. 5,850,479.

STATEMENT OF GOVERNMENTAL INTEREST

This invention was made with Government support under contract No. N00039-91-C-0001 awarded by the U.S. Navy Department. The Government has certain rights in this invention.

BACKGROUND OF THE INVENTION

The invention relates to a novel optical feature extractor and a method for symbolically encoding DNA bases to permit detection of a class of DNA sequences based on their symmetry.

The degree of computational parallelism available using optics has generated great interest in optical approaches to pattern recognition and computation in general. The performance of optical pattern recognition techniques has in some cases been quite remarkable, while in others the results have been less than satisfactory. The level of performance often has much to do with how well-conditioned a problem is to an optical approach or architecture. For example, problems in image interpretation may be complicated by scale, rotation, and perspective variabilities or distortions that reduce the degree of correlation between reference objects and images under examination. Assembly line inspection, optical character recognition of printed text, and other problems in which image content and structure are constrained are more tractable due to the reduced number of degrees of freedom.

In some cases transformations exist that allow the offending properties of images to be removed (e.g., use of the Mellin transform to convert scale variant objects to translation variant features). In others the investigator is able to exploit the structure or representation of a problem by using optical methods. DNA sequence analysis is a problem that can be exploited by using optical methods.

The sequence of bases along each strand of DNA forms the fundamental genetic information in each individual and organism. While only 4 types of subunits are used in DNA (denoted by the symbols A, C, G, and T in FIG. 1), the number of different possible sequences of length N is $4^N$. As the length N of the human genome is approximately $3 \times 10^9$ this allows for a rather large number of possible human DNA sequences. An important structural element of DNA is that the sequences on each of the two strands of which DNA is composed are complementary; an A base on one strand is hydrogen bonded to a T base on the opposite strand of the double helix. Likewise, a G on one strand indicates a C on the opposite strand at the same position along the DNA. Thus, knowledge of the sequence of one strand immediately defines the sequence along the complementary strand.

In order to understand the genetic basis of disease and evolutionary relationships between species and individuals, molecular biologists have found it useful to sift through a vast collection of such sequences, looking for themes and relationships between subsequences constituting genes and other genetic landmarks. Their efforts have been impressive yet modest, given the scale of the problem and the computational resources available.

A set of sequences known as "palindromes" are important landmarks, both to the biochemical machinery of the living cell and for navigational purposes to the investigator. They are a class of DNA sequences known to have special regulatory functions in biological systems and distinguished by the antisymmetric arrangement of bases in palindromic sequences. They are DNA sequences that have a 2-fold inversion symmetry (i.e., sequences that conform to the scheme $XY=\overline{YX}$).

A system of enzymes ("restriction enzymes") able to recognize and act on palindromic sequences has evolved in many living organisms. The symmetric composition of the DNA restriction sites has been exploited in the evolution of enzymes having in many cases a 2-fold dyadic structure. These enzymes are used by researchers to cut and splice segments of DNA at the sites of the palindromic sequences recognized by the restriction enzymes.

Currently, genetic sequence databases contain on the order of $10^8$ bases of sequence data gathered from organisms of all types, determined primarily in the last 10 years. The rate of sequence determination is increasing exponentially and is expected to do so for years to come. With each newly logged sequence a time consuming search for palindromes is begun. The scientific community needs new approaches to reduce the search time required.

SUMMARY OF THE INVENTION

The need for faster searching of DNA sequences has resulted in the development of a multichannel optical architecture which can rapidly search for symbolically encoded sequences of DNA base information and detect palindromic sequences of length-6, a common object of sequence searches. This approach uses video display, spatial light modulation, and detection components in conjunction with microlenslet replicating optics, to expedite the recognition of symbol sequences based on their symmetry properties. Multichannel operation is achieved through the replication of input scenery, making possible a higher throughput rate than for single channel systems. The method of the invention uses a symbolic representation of the DNA subunits to facilitate the classification of sequences as palindromic or nonpalindromic.

A notable feature of this optical approach is the exchanged positions of input scenery and the filter set. The conventional treatment has been to display the input scene on a monitor for projection onto a set of feature extraction vectors realized as amplitude modulated LCTV devices or lithographically prepared masks. Instead, the invention provides the filter set as input to the system and correspondingly places the sequence data in the filter plane of the system, relying on the commutativity of projection to allow this role reversal.

The optical feature extractor of the invention can classify short (6 bases in length) sequences of DNA as palindrome or nonpalindrome. This classification is made on the basis of the sequence symmetry, independent of base composition.

BRIEF DESCRIPTION OF THE DRAWINGS

FIG. 1 illustrates a tract of a double stranded DNA molecule containing a length-6 palindromic sequence (in the box) within a longer sequence. Each strand is read in the direction of the arrows.

FIG. 2, consisting of FIGS. 2a, 2b, and 2c, illustrates the DNA base representation method of the invention as follows:

FIG. 2a: symbols for individual bases;

FIG. 2b: a nonpalindromic sequence (AATTCG) of length 6;

FIG. 2c: a length-6 palindrome. (Note the 2-fold rotation symmetry of FIG. 2c.) The stippled cells correspond to transparent regions of the mask on which the DNA sequences are encoded, while white cells correspond to opaque regions.

DETAILED DESCRIPTION OF THE PREFERRED EMBODIMENT

The optical architecture of the invention described herein serves as the main computational engine of a DNA sequence analysis system. Such a system uses dynamic spatial light modulators in the optical architecture and integrates this architecture with a rapid access DNA database and a post-detection decision processor.

The basic goal is to use a sequence representation that allows a determination whether any 6-base sequence is palindromic or not. This is done by examining the sequence for the 2-fold symmetry that characterizes palindromes rather than by examining the sequence composition on a position-by-position basis. This method saves the searcher from having to compare each sequence with a list of length-6 palindromes, of which there are 64. Thus the search is carried out by probing for a single symmetry feature common to all 64 possible palindromes rather than by performing a comparison between the sequence in question and each sequence on this list. This reduces the computational complexity of the search tremendously.

Symmetry searching is made possible by use of a binary DNA base representation (FIG. 2a) that has been designed in cognizance both of the base pairing rules governing DNA sequences and of the goals of the searches undertaken. Each symbol is made up of four cells (square in this embodiment) that are used to spatially modulate the intensity of an impinging beam of light. In this representation, the symbol for an A base is just the complement of the symbol for a T, while similarly the symbol for a G is the complement of C. The 4-bit representation used here also ensures that the A symbol is the same as the T symbol in reverse order and likewise for G and C. Finally, a design has been selected in which each of the four symbols has 2 opaque cells and 2 transparent cells; this balance gives each type of base equal weighting and ensures that complementarity can be encoded in the representation.

A sequence of bases can be represented by stacking these base symbols vertically (FIG. 2b). Stacks of six symbols, representing tracts of six consecutive bases in a DNA sequence, will have perfect 2-fold symmetry if and only if the sequence is palindromic. Examples of nonpalindromic and palindromic sequences encoded in this representation appear in FIGS. 2b and 2c.

The filter set used in this work is designed to extract the features necessary to classify the sequence blocks of interest here (palindromes). The optical architecture is more general—different searches and classification schemes can be implemented by use of different filter sets and data representations.

Figure 3:
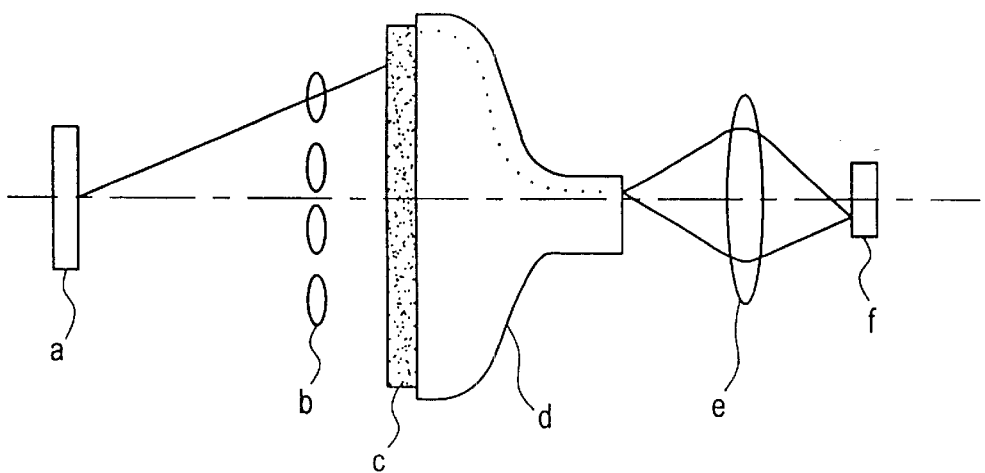
FIG. 3 illustrates schematically the optical components of the feature extractor of the invention: (a) display monitor, (b) lenslet array, (c) mask, (d) tapered fiber bundle, (e) collection lens, and (f) CCD detector array.

The invention utilizes replicating micro-optics to achieve multichannel correlation between the DNA sequence blocks under investigation and a set of filters for the purpose of forming optical products between the filters and sequence blocks. Subsequent optical components transfer these products to a charge coupled device (CCD) detector array for measurement. This embodiment is shown in FIG. 3.

Figure 4:
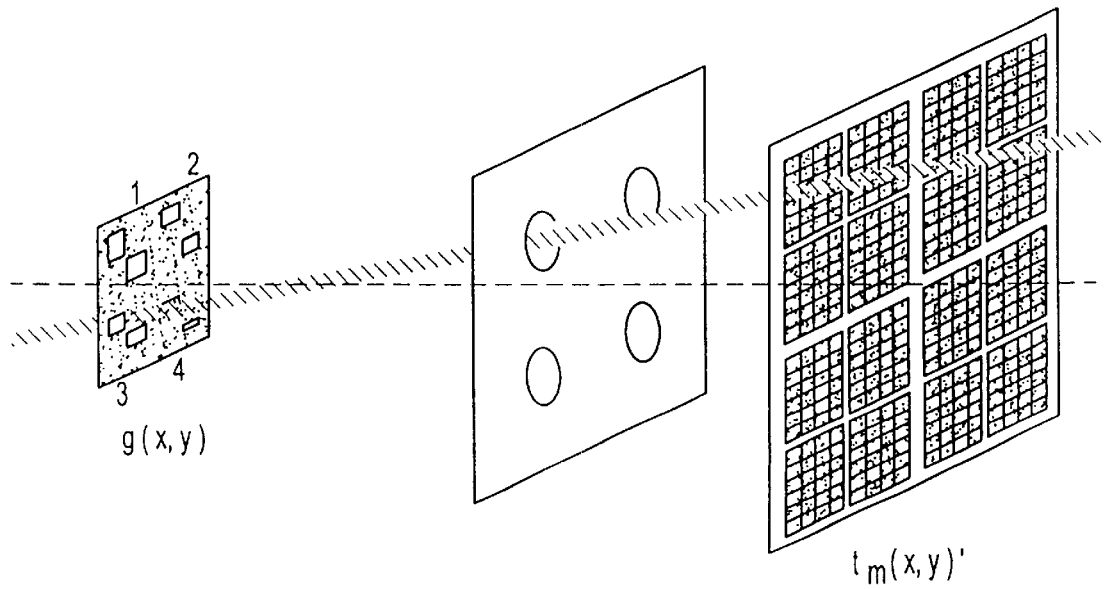
FIG. 4 illustrates imaging of one of the display filters (number 4) comprising g(x,y) onto a single copy of a sequence block of $t_m(x,y)'$ by a lenslet of a 2×2 array. Each lenslet images the complete filter set onto 4 copies of a sequence block in the mask plane. Four blocks are shown in the figure.

A filter set, composed of dark (opaque) and bright (transparent) square regions, is displayed on a television screen and replicated by a rectilinear array of plano-convex lenslets. The filter intensity distribution is described by the function g(x,y). Imaging of the display object g(x,y) by the array of lenslets onto a mask encoded with blocks of sequence data is shown in FIG. 4.

A subsampled hexagonal array made by the Corning FOTOFORM® process is used to perform multichannel classification. Each lenslet in the array has a diameter of $d_1$=450 µm, with a center-to-center spacing of 584 µm. Photolithographic mask material is used to block light from all but a 4×4 subarray of lenslets on a Cartesian lattice. The lenslet interspacing distances of this subarray $\Delta_x$ and $\Delta_y$ are equal to 7.008 mm and 6.069 mm, respectively. For a focal length f (20 mm for the lenslets used in this work), the object and image distances $s_o$ and $s_i$ obey the Gaussian lens equation:

$$1/f = 1/s_o + 1/s_i, \quad (1)$$

and $$M = 1/\mu = -s_i/s_o. \quad (2)$$

Consider the display object g(x,y) centered on the origin, normal to the optical axis z, and of width X and height Y in the x-y plane. A lenslet array is placed normal to the z-axis at $z=s_o$, with the z-axis passing through a point equally spaced between lenslets separated horizontally by $\Delta_x$ and vertically by $\Delta_y$. The position of each lenslet in the array is indexed by the numbers $n_x$ and $n_y$; positive values for $n_x$ and $n_y$ indicate a position to the right of and above the origin, respectively. The center of the image from lenslet $(n_x,n_y)$ has coordinates $(x_0,y_0)'$ $$x_0 = (1+|M|) \cdot (2n_x-1) \cdot \Delta_x/2,$$

$$y_0 = (1+|M|) \cdot (2n_y-1) \cdot \Delta_y/2, \quad (3)$$

in the image (primed) plane $z=s_o+s_i$, as determined by Eq. 1. The light intensity in the image plane for an ideal lossless case is $$I(x,y)' = \mu^2 \cdot g[\mu \cdot (x-x_0)', \mu \cdot (y-y_0)'] \quad (4)$$

The factor $\mu^2$ accounts for the change in area between object and image. A sequence block encoded as a binary transmission object and centered at these coordinates in the focal plane of the lenslet array will further modulate the light intensity. The intensity distribution representing the filter-mask product $I_m(x,y)'$ available just beyond this mask is given by $$I_m(x,y)'=I(x,y)'\cdot t_m(x,y)', \quad (5)$$

where $t_m(x,y)'$ is the transmission function of the mask. An array with focal length f=20 mm and an object distance $s_o$=70 mm is used, yielding an image distance of $s_i$=28 mm. For $|s_o|>2f$, $0>M>-1$, an inverted, minified image of the display filters results.

In fact, the displayed function g(x,y) is made up of 4 subfilters. The mask $t_m(x,y)'$ is made up of 16 cells laid out on a 4×4 lattice. Each such cell contains 4 copies of a length-6 sequence block. Thus, each of the 16 lenslets projects a set of 4 filters onto 4 copies of a sequence block. The intensity distribution $I_m(x,y)'$ due to a single lenslet then contains the information necessary for classification of the sequence block subsequent to detection by a CCD array.

An important result here is that by selective subsampling of the lenslet array, different, even variable spacing of the mask plane patterns can be accommodated for a given magnification. This allows some flexibility in the use of mask devices having varying scales and spatial resolutions, which can be accommodated by revision of object and image distances and the use of different lenslet array subsamplings. It is possible to select values of $s_o$, $s_i$, $n_x$, and $n_y$ such that the lenslets yield focused, overlapping images in the mask plane. Such imaging is undesirable in this application but might prove useful for other correlation studies. The condition for no overlap in the x' or y' dimension is $$|M|\cdot X<\Delta_x, \quad |M|\cdot Y<\Delta_y. \quad (6)$$

For any given values of $s_o$, $s_i$, $n_x$, and $n_y$ overlap can be averted by reducing X or Y, but at the cost of reduced use of the space-bandwidth product available for a display of given resolution and extent.

Figure 5:
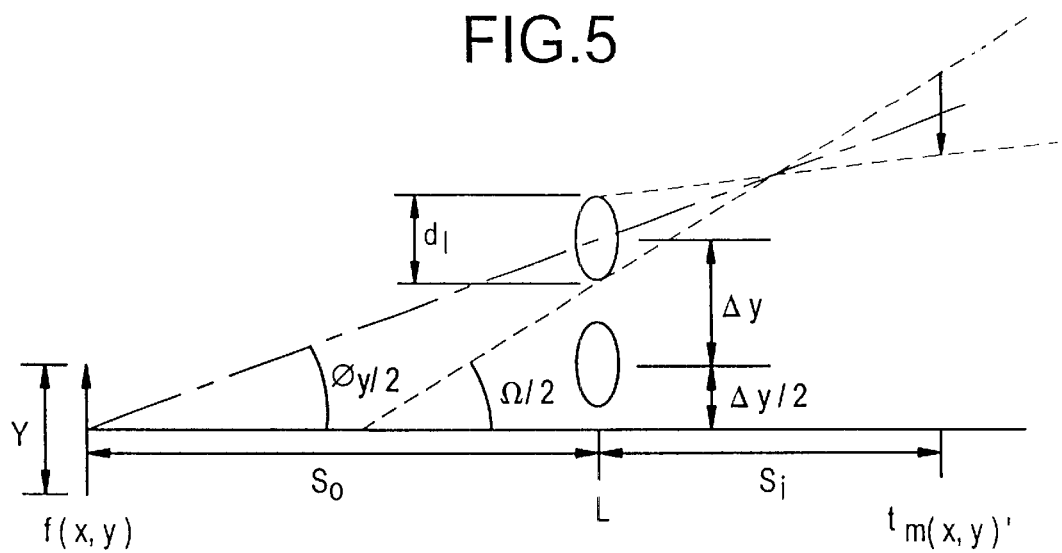
FIG. 5 illustrates a two-dimensional view of the arrangement of the filter set f(x,y), lenslet array L, and mask $t_m(x,y)'$ of the optical feature extractor of the invention. The most divergent ray of the optical system is shown as a dotted line at an angle $\Omega/2$ to the z-axis. Lenslet diameter is denoted by $d_1$, lenslet interspacing by $\Delta_y$, and filter height by Y. Larger numbers of lenslets or increased lenslet interspacing would result in pronounced vignetting due to a consequent increase $\Omega/2$. A TFB with sufficient numerical aperture can receive all rays exiting the mask.

FIG. 5 illustrates the problem of divergence due to an off-axis object. Because each lenslet sees the display as an off-axis object, the chief rays of each of the lenslets diverge. The divergence is a function of both object-lenslet-image dimensions and the lenslet interspacings. Chief rays of each lenslet diverge from the optical axis of the system at a half angle of $$\phi_x/2=\tan^{-1}[\Delta_x\cdot(2n_x-1)/(2s_o)],$$

$$\phi_y/2=\tan^{-1}[\Delta_y\cdot(2n_y-1)/(2s_o)], \quad (7)$$

A single angle $\Omega$ can be used to express divergence in both x- and y-directions. Correspondingly, diagonal distances (using s- to replace x- and y-directions) are used in the two-dimensional formulae. Divergence of light from each lenslet about its chief ray increases the system overall divergence half angle to $$\Omega/2=\tan^{-1}\{[|M|\cdot[\Delta_s/2\cdot(2n_s-1)+S/2]+d_l/2]/s_i\}, \quad (8)$$

where $$n_s=(n_x^2+n_y^2)^{1/2}, \quad S=(X^2+Y^2)^{1/2},$$

and $$\Delta_s=(\Delta_x^2+\Delta_y^2)^{1/2}. \quad (9)$$

A significant part of this divergence results from the lenslet spacings. This is effectively equivalent to a high divergence source placed in the object plane, and increases the demand for fast collection optics to image the mask plane onto the detector array. The approach here has been to reduce the divergence of the system by using an imaging tapered fiber bundle (TFB) placed in contact with the mask. The basic operation of the TFB is to reduce the scale of the object $I_m(x,y)'$ by a factor r, so that the light is redistributed at the fiber bundle output plane (x,y)'' as $$I_b(x,y)''=k\cdot r^2\cdot I_m(rx,ry)', \quad (10)$$

where k is the transmission efficiency of the TFB. A TFB allowing a scale reduction of r=2 was placed in contact with the sequence mask. The diameters of individual fibers comprising the TFB are 6 $\mu$m at the input (large) end and 3 $\mu$m at the output end. These fibers are arranged as a hexagonal close packed array. The smallest opaque or transparent region of the distribution $I_m(x,y)'$ illuminates approximately 7000 fibers, ensuring adequate resolution of the input image by the TFB and subsequent optics. The transmission efficiency k of the TFB is approximately 50% (some of the light impinging on the TFB is lost between fibers and the remainder lost to reflection and attenuation within the bundle). The reduction in area by a factor of 4 in transiting the TFB combines with the light loss to yield an approximate doubling of the output irradiance.

The reduced size of the filter-mask product is not sufficient using this TFB to match the dimensions of the CCD array detector (8.8 mm horizontal×6.6 mm vertical). Moreover, the numerical aperture of the TFB output is large (approximately 1.0). In transiting the CCD array faceplate of thickness ~1.0 mm, light from each fiber would broaden to the extent that poor image formation at the CCD detector array would result, with consequent loss of resolution.

To circumvent this shortcoming, a lens system to match the TFB output to the dimensions of the detector is used. A further benefit of the TFB is that all fibers in the bundle have parallel axes at the output end, reducing the divergence and lessening the demands on the collection optics. The numerical aperture of the collection optics need only accept the divergence resulting from the assemblage of individual parallel fibers.

Figure 6:
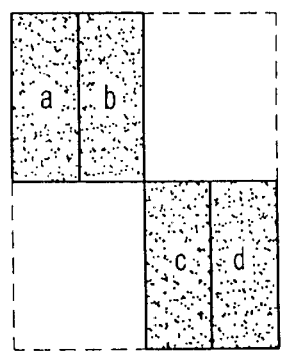
FIG. 6 illustrates a region of a CCD detector in the optical feature extractor of the invention that is illuminated by a filter-mask product. Each of the regions a, b, c, and d is integrated to a single signal for subsequent processing.

The described optical system is designed to achieve faithful reproduction of the filter-mask products from each DNA sequence block at the plane of the CCD detector array. In order to classify each sequence block as palindrome or nonpalindrome, subsequent processing of the optical signals must be performed. The CCD signals are processed by a frame grabber and the raster signal passed to image processing software. This software segments the data for each filter-mask product into 4 regions (see FIG. 6). The signals within each region are integrated by software, resulting in a set of 16 signals for each sequence under investigation. Because of the cellular composition of the filter-mask products and the shape of the integration regions, the signal arising from an integrated region will have values falling into 4 ranges. Ideally, these signals can be scaled to quantized values of only 0, 1, 2, or 3. These correspond to the number of illuminated regions. Thus, the grayscale resolution required of the detector is not great (2 bits). In reality, distortion, noise, and unequal illumination and transmission across the optical components cause these signal levels to broaden. Thresholding is used in the post-detection processor to assign scaled, quantized levels to the measured integrated signals. Palindromic sequences result in equal signals among all pairs of symmetrically placed integration regions while nonpalindromic sequences do not. Equality of these pairs is determined by computer software, which then performs the sequence classification.

The filter set described above permits probing the DNA sequences for the information necessary to classify sequences correctly as palindromic or nonpalindromic. This problem represents a specific case of a larger set of analyses relevant to DNA research. The strategy employed here can be applied to many other DNA sequence analyses through the development of different filter sets for the extraction of features of importance to those analyses. Where necessary, different sequence representations can be developed to carry the required sequence information.

The correlator-classifier architecture described uses replicating lenslet arrays to present multiple copies of an off-axis input image to the remainder of the optical system. The principal benefits of such arrays are the uniform magnification and spacing of the images, and the possibility of varying the spacing by subsampling the array. A property constraining their use is the vignetting that can occur for significantly off-axis objects. Increasing the lenslet diameter, decreasing the lenslet spacing, and reducing the sequence mask features would all help to keep rays close to the system optical axis.

A TFB with sufficiently large image reduction could be butted directly against the CCD detector active area, eliminating the need for collection lenses to image the mask plane onto the CCD. Such a TFB-detector device would greatly reduce the length of the optical system. This configuration would also reduce the numerical aperture (and size) of the collection optics by receiving the mask output before its divergence is further broadened. The diameter of fibers in TFBs are typically small compared to CCD pixel dimensions. Coordinating the fiber and CCD pixel dimensions and arrangements would maintain optimal resolution.

An efficient and general DNA sequence analysis system can use the described architecture. Several requirements of such a system are clear. Improvement in the optical architecture will result from the use of dynamic spatial light modulators (SLM) for both filter and sequence input. Speed of the system will result from transferring the contents of a DNA sequence library (GenBank release 61) stored on CD-ROM to the SLM in place of the lithographically produced mask described herein. Reducing the vignetting associated with large lenslet arrays to allow a larger number of channels is central. Also of interest are tradeoffs between speed, spatial resolution, dynamic range, and information density, and how to find the proper balance between the limitations of available devices. The processing rates for a multi-channel correlation system incorporating dynamic spatial light modulators are projected as follows:

|  | Current Architecture | Projected Architecture |
| --- | --- | --- |
| Frame Rate | 30 Hz | 100 Hz |
| Number of channels | 16 | 1024 |
| Correlations/second | 480 | $10^5$ |
| Binary operations/second | $2.3 \times 10^4$ | $4.8 \times 10^6$ |
| Genbank search time | 2.4 days | 17 minutes |

This projection is based on use of a 4×4 lenslet array and video frame rates (30 Hz) for the current configuration. Use of a parallel CCD detection array device in place of the frame rate device is assumed in the projections. Future realizations would employ high frame rate magneto-optic spatial light modulators and increased lenslet numbers.

Palindrome detection takes place in a single pass through the system. This architecture can be used more generally to perform a broader set of analyses or classification operations by inclusion of a feedback system. The post-detection processor used here to perform classification is capable of selecting alternate filter sets based on the signals extracted during the first pass. Interrogation of the sequence blocks during subsequent passes can extract the signals necessary to make other common DNA sequence classifications.

We claim:

1. A method for representing a base of a DNA molecule in a binary form comprising the step of combining a plurality of cells for spatially modulating the intensity of an impinging beam of light, the plurality of cells containing opaque cells and transparent cells for encoding the DNA base.

2. The method as recited in claim 1, wherein the DNA base is represented by four cells, two cells being opaque and two cells being transparent.

3. The method as recited in claim 2, wherein the cells representing an A base are in reverse order of the cells representing a T base and the cells representing a G base are in reverse order of the cells representing a C base.

4. A method for representing a sequence of DNA bases comprising the step of stacking vertically the cells as recited in claim 3 representing the DNA bases.

5. The method as recited in claim 4, wherein the stack of cells is symmetrical both vertically and horizontally in order to classify a DNA sequence as a palindrome or nonpalindrome.

6. The method as recited in claim 2, wherein the cells representing an A base are the complement of the cells representing a T base and the cells representing a G base are the complement of the cells representing a C base.

7. A method for creating a filter for use in an optical feature extractor for classifying DNA sequences, the method comprising the steps of:

combining a plurality of cells for spatially modulating the intensity of an impinging beam of light, the plurality of cells containing opaque cells and transparent cells for encoding a DNA base; and stacking vertically the cells representing a plurality of encoded DNA bases.

8. The method as recited in claim 7, wherein each DNA base is represented by four cells, two cells being opaque and two cells being transparent.

9. The method as recited in claim 8, wherein the cells representing an A base are the complement of the cells representing a T base and the cells representing a G base are the complement of the cells representing a C base.

10. The method as recited in claim 9, wherein the cells representing an A base are in reverse order of the cells representing a T base and the cells representing a G base are in reverse order of the cells representing a C base.

11. The method as recited in claim 10, wherein the stack of cells comprises a plurality of consecutive bases in a DNA sequence.

12. The method as recited in claim 11, wherein the stack of cells is symmetrical both vertically and horizontally in order to classify a DNA sequence as a palindrome or nonpalindrome.

13. The method as recited in claim 12, wherein the stack of cells comprises six consecutive bases in a DNA sequence.

14. A filter for use in an optical feature extractor for classifying DNA sequences comprising a vertical stack of a plurality of encoded DNA bases, each encoded DNA base comprising a plurality of opaque cells and transparent cells for spatially modulating the intensity of an impinging beam of light to encode the DNA base.

15. The filter as recited in claim 14, wherein each DNA base is represented by four cells, two cells being opaque and two cells being transparent.

16. The filter as recited in claim 15, wherein the cells representing an A base are the complement of the cells representing a T base and the cells representing a G base are the complement of the cells representing a C base.

17. The filter as recited in claim 16, wherein the cells representing an A base are in reverse order of the cells representing a T base and the cells representing a G base are in reverse order of the cells representing a C base.

18. The filter as recited in claim 17, wherein the stack of cells comprises a plurality of consecutive bases in a DNA sequence.

19. The filter as recited in claim 18, wherein the stack of cells is symmetrical both vertically and horizontally in order to classify a DNA sequence as a palindrome or nonpalindrome.

20. The filter as recited in claim 19, wherein the stack of cells comprises six consecutive bases in a DNA sequence.

* * * * *

UNITED STATES PATENT AND TRADEMARK OFFICE
CERTIFICATE OF CORRECTION

PATENT NO. : 6,415,047 B1
DATED : July 2, 2002
INVENTOR(S) : David H. Terry, William A. Christens-Barry and Bradley G. Boone It is certified that error appears in the above-identified patent and that said Letters Patent is hereby corrected as shown below:

<u>Column 8,</u>
Line 16, after "claim" delete "2" and insert -- 6 --.

Signed and Sealed this

Twelfth Day of November, 2002

Attest:

JAMES E. ROGAN
Attesting Officer  Director of the United States Patent and Trademark Office